United States Patent
Staver et al.

[11] Patent Number: 5,987,042
[45] Date of Patent: Nov. 16, 1999

[54] METHOD AND APPARATUS FOR SHAPING A LASER PULSE

[75] Inventors: Phillip Randall Staver, Hagaman; Josef Robert Unternahrer, Niskayuna, both of N.Y.

[73] Assignee: General Electric Company, Schenectady, N.Y.

[21] Appl. No.: 08/961,584

[22] Filed: Oct. 31, 1997

[51] Int. Cl.[6] .................................................. H01S 3/11
[52] U.S. Cl. ................................ 372/30; 372/10; 372/25
[58] Field of Search .................................... 372/9, 10, 12, 372/25, 30, 33, 38

[56] References Cited

U.S. PATENT DOCUMENTS

| | | | |
|---|---|---|---|
| 4,959,838 | 9/1990 | Barnes | 372/25 |
| 4,995,044 | 2/1991 | Blazo | 372/25 |
| 5,127,019 | 6/1992 | Epstein et al. | 372/108 |
| 5,343,483 | 8/1994 | Farrell et al. | 372/10 |

OTHER PUBLICATIONS

Eustace L. Dereniak and Devon G. Crowe, *Optical Radiation Detectors*, 140–143, 148–149 (1984), John Wiley & Sons, New York.

Warren J. Smith, *Modern Optical Engineering*, 360–363 (1990), 2nd Ed., McGraw–Hill, New York.

*Primary Examiner*—John D. Lee
*Attorney, Agent, or Firm*—Patrick K. Patnode; Marvin Snyder

[57] ABSTRACT

The invention relates to a method and apparatus for shaping a laser pulse. The method comprises the steps of generating a laser pulse with a laser, opening an optical switch to allow the laser pulse to pass through the optical switch, determining a first reference time point with respect to the laser pulse, determining a second reference time point with respect to the opening of the optical switch, and adjusting an opening time of the optical switch based on the first and second reference time points to shape the laser pulse. The method may be carried out with an apparatus which comprises a laser which generates the laser pulse, a first optical detector which detects the laser pulse and generates a first signal representing the laser pulse, an optical switch through which the laser pulse passes, a second optical detector which detects the laser pulse after the laser pulse has passed through the optical switch, and which generates a second signal representing the laser pulse, a computer which receives the first and second signals and which calculates a delay period based on the first and second signals, and a pulse generator which receives the delay period from the computer and which generates a pulse delayed by the delay period to open the optical switch.

11 Claims, 7 Drawing Sheets

METHOD AND APPARATUS FOR SHAPING A LASER PULSE

FIELD OF THE INVENTION

Present invention relates generally to the control of laser pulses, and more particularly to a method and apparatus for adjusting the timing of a pulse slicer to compensate for temporal drifts in the laser pulse.

DESCRIPTION OF THE RELATED ART

In many industrial applications using lasers, it is important to carefully control the parameters of the laser beam to achieve a desired physical effect. One example is laser shock peening, which is a process used to improve the surface characteristics of materials such as metals by the formation of a surface layer in the material which is in a state of compressive residual stress. In the laser shock peening process, a pulsed laser beam is typically focused through a transparent inertial confinement layer such as water, onto a part coated with an absorbing, ablative material such as paint, to generate a shock wave that plastically stretches the surface region of the part. The plastic deformation in the surface of the part produces a state of residual compressive stress in the part surface, which makes the part much more resistant to fatigue failure than an untreated part, because surface flaws are pressed together and their growth into cracks is inhibited. Laser shock peening is particularly useful, for example, in treating compressor fan blades in jet aircraft engines which comprise high temperature superalloys.

In laser shock peening, the mechanical stress generated by the laser pulse is typically very sensitive to the characteristics of the laser pulse. For example, the rise time of the laser pulse and the energy of the pulse can have a significant effect on the resulting compressive stress which is generated in the part. To improve the mechanical effects caused by the laser pulse, solid state electro optical switches can be used as pulse slicers to sharpen the leading edge of the laser pulse. Typically, the pulse slicer is activated, along with the laser, in response to a master clock trigger. However, it is common for the laser pulse to drift in time with respect to the master clock trigger during normal peening operations as a result of gradual changes in the pump pulses, accumulated gain, and round trip losses of the oscillator, for example. Consequently, the pulse is sliced at a point which may be too early or late in time, adversely affecting the ability of the system to generate the desired mechanical stresses in the shock peening target.

It would be desirable, therefore, to have an apparatus and method capable of monitoring the temporal drift of the laser pulse and automatically adjusting the timing of the pulse slicer to maintain a fixed position of the slicer with respect to the laser pulse to improve the laser shock peening process.

SUMMARY

The method, according to an exemplary embodiment of the invention, comprises the steps of generating a laser pulse with a laser, opening an optical switch to allow the laser pulse to pass through the optical switch, determining a first reference time point with respect to the laser pulse, determining a second reference time point with respect to the opening of the optical switch, and adjusting an opening time of the optical switch based on the first and second reference time points to shape the laser pulse.

The method may be carried out with an apparatus which may comprise a laser which generates the laser pulse, a first optical detector which detects the laser pulse and generates a first signal representing the laser pulse, an optical switch through which the laser pulse passes, a second optical detector which detects the laser pulse after the laser pulse has passed through the optical switch, and which generates a second signal representing the laser pulse, a computer which receives the first and second signals and which calculates a delay period based on the first and second signals, and a pulse generator which receives the delay period from the computer and which generates a pulse delayed by the delay period to open the optical switch.

The method and apparatus can significantly improve the laser shock peening process, for example, by actively controlling the relative timing of the laser pulse and the opening of the optical switch to consistently slice the laser pulse at a desired time, despite temporal drifts in the system. The resulting pulses have a shape which is effective for generating the desired mechanical stresses in the laser shock peening target.

BRIEF DESCRIPTION OF THE DRAWINGS

Other features and advantages of the invention will be more readily understood upon reading the following detailed description in conjunction with the drawings, in which.

DETAILED DESCRIPTION OF THE PREFERRED EMBODIMENTS

Figure 1:
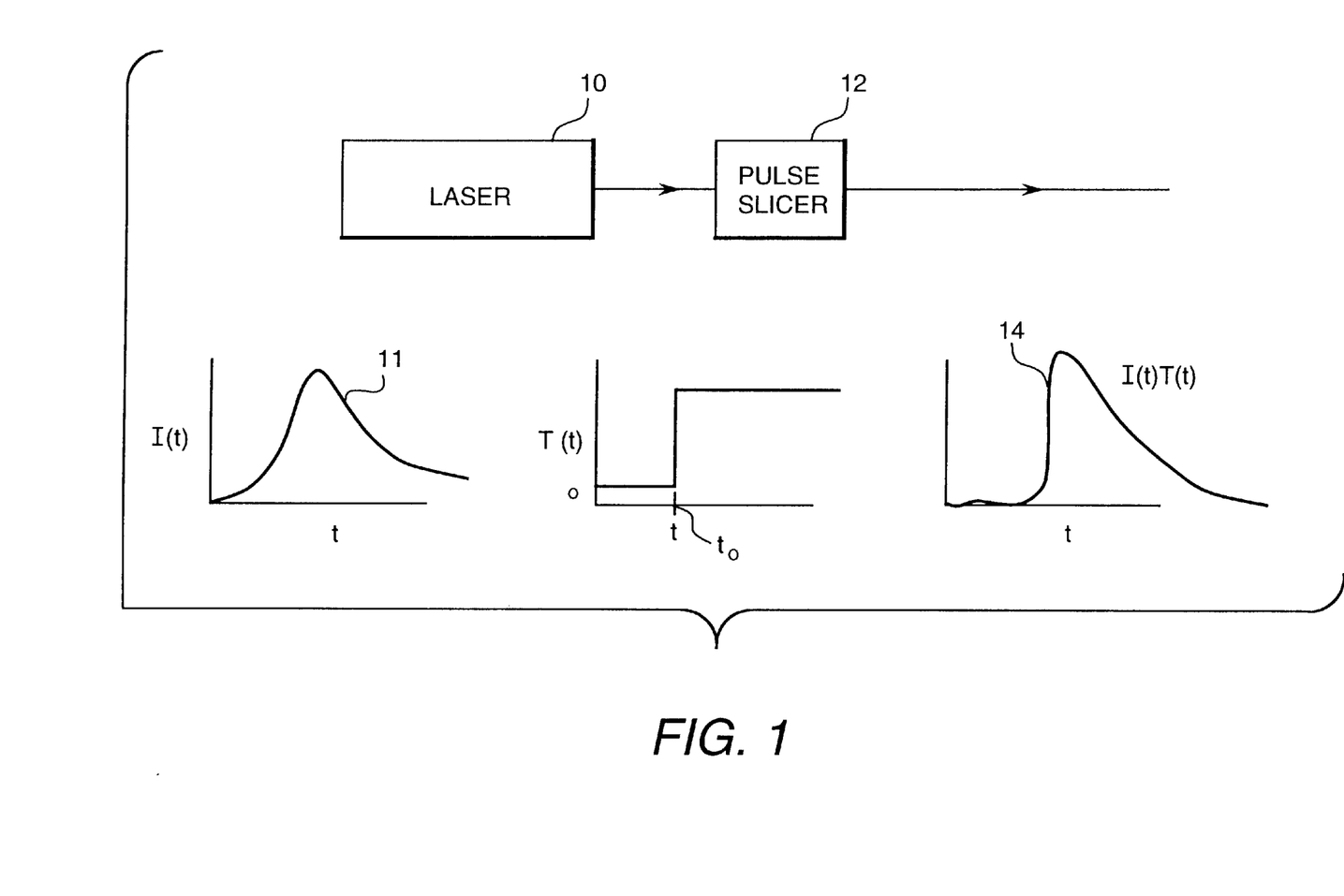
FIG. 1 is an illustration of the pulse slicing process.

FIG. 1 depicts the operation of a pulse slicer in sharpening the leading edge of a laser pulse used in an application such as laser shock peening. The laser 10 generates a pulse 11 which is incident on an electro-optic pulse slicer 12. The pulse slicer 12 may comprise, for example, a Pockels cell and a polarizer. The pulse slicer 12 is opened at a time $t_0$ to allow the pulse to propagate through the pulse slicer thereafter, with the result that the pulse is sliced to produce a sharp leading edge 14 which is beneficial for laser shock peening.

Figure 2:
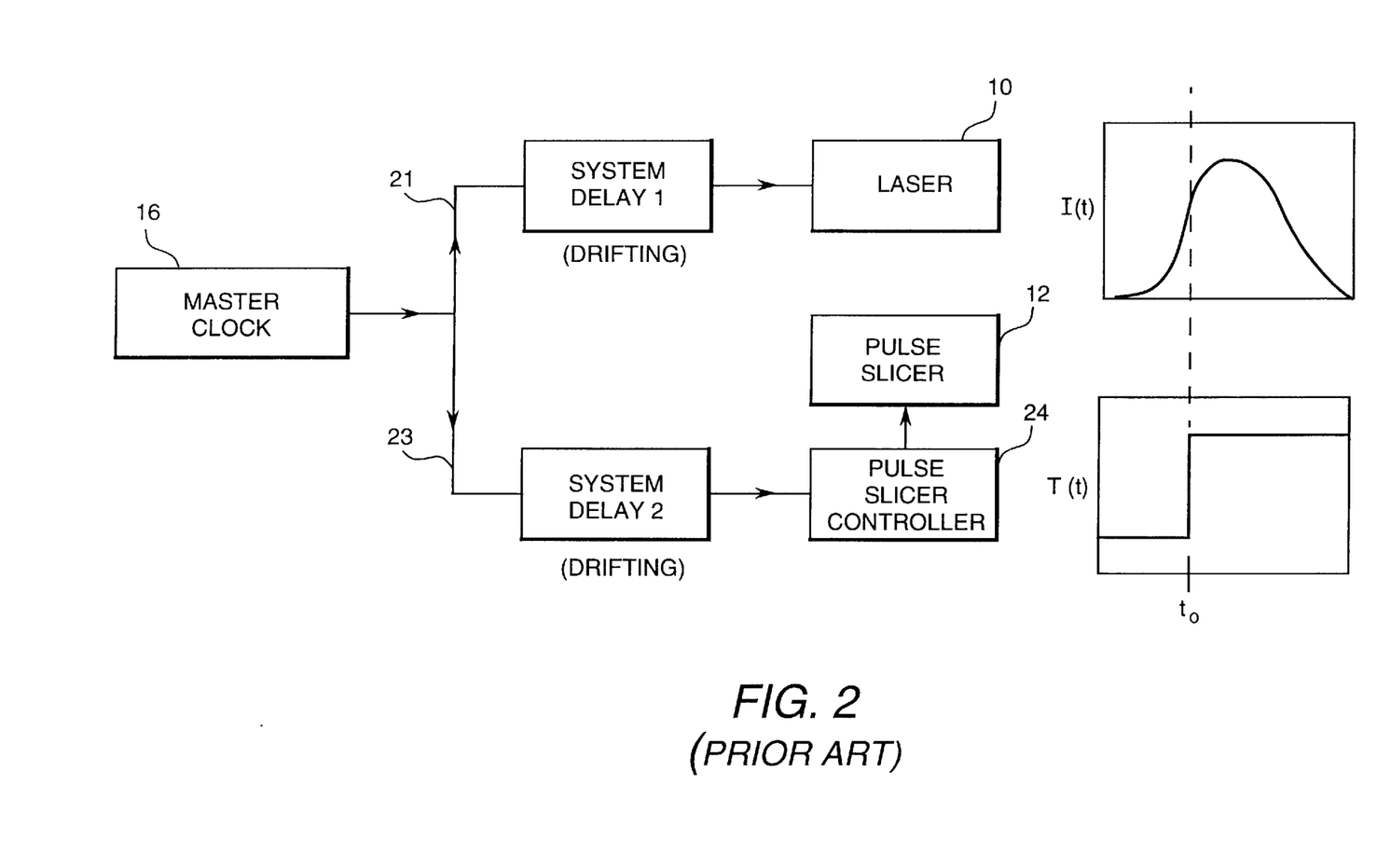
FIG. 2 is a diagram of a conventional pulse slicing apparatus.

FIG. 2 illustrates the electronic components which control the timing of the laser 10 and the pulse slicer 12 in a conventional apparatus. A master clock 16 repeatedly initiates the firing of the laser 10 and the opening of the pulse slicer 12. As shown in FIG. 2, the timing signal output by the master clock 16 is transmitted through cables 21, 23, respectively, to the laser 10 which generates the laser pulses and to a pulse slicer controller 24 which opens the pulse slicer 12. The pulse slicer controller 24 may include a coarse (e.g. in microseconds), manually controlled delay circuit which delays the high voltage signal which opens the pulse slicer 12 with respect to the master clock signal.

In the system shown in FIG. 2, systematic timing errors are commonly introduced in operation which alter the relative timing of the laser pulse and the pulse slicer. Such systematic errors may include, for example, gradual changes in the pump pulses, accumulated gain, and round trip losses of the oscillator. The components of the pulse slicer 12 and pulse slicer controller 24 may also experience systematic timing errors which cause the timing of the slice to drift. In addition, the cables 21, 23 have a finite length which introduces an additional delay into the clock signal. These delays, which may drift over time causing the laser pulse to fire earlier or later than desired, are represented by the boxes marked "system delay 1" and "system delay 2".

Figure 3A:
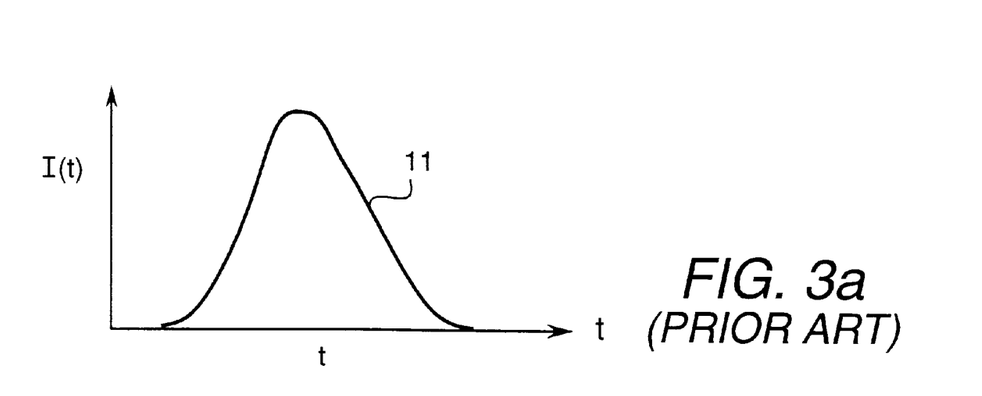
FIG. 3a–3f illustrate the pulses produced by a conventional system experiencing temporal drifting.
Figure 3B:
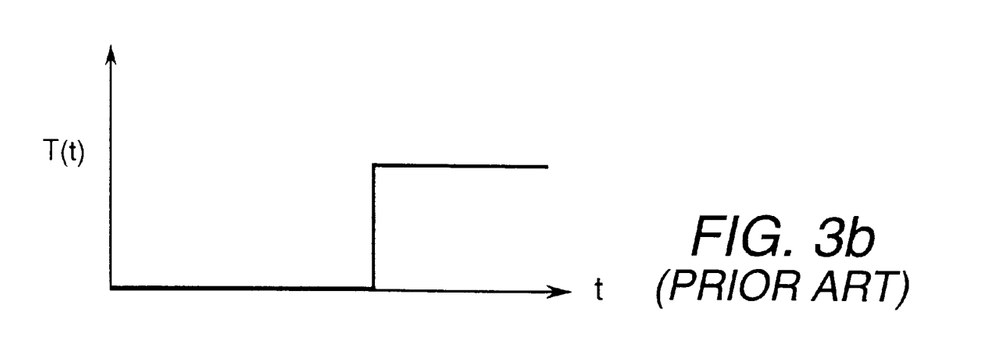
Figure 3C:
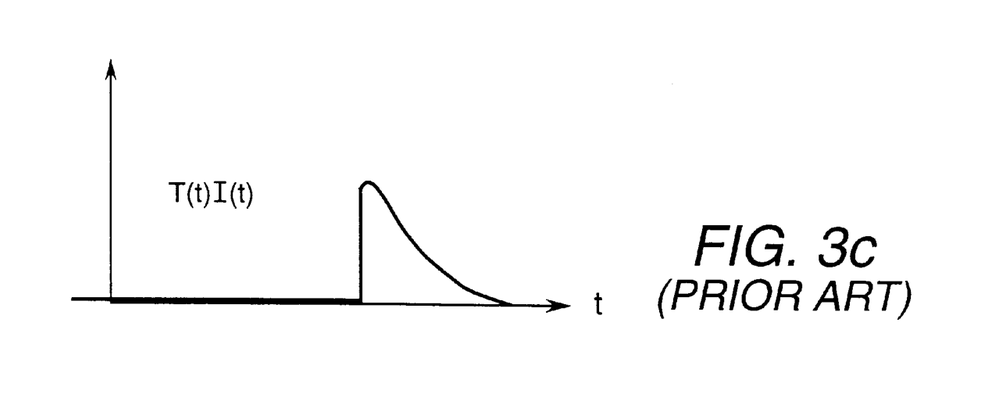
Figure 3D:
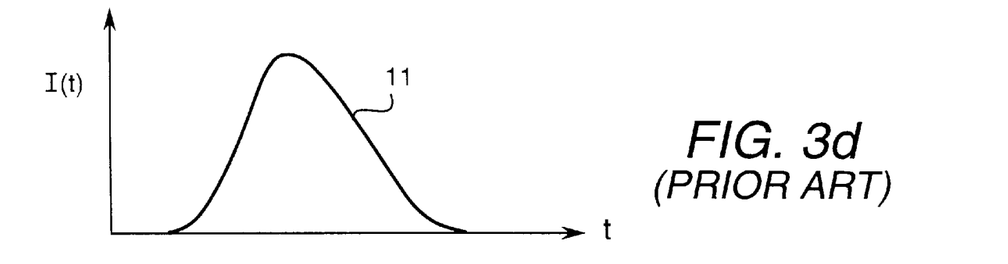
Figure 3E:
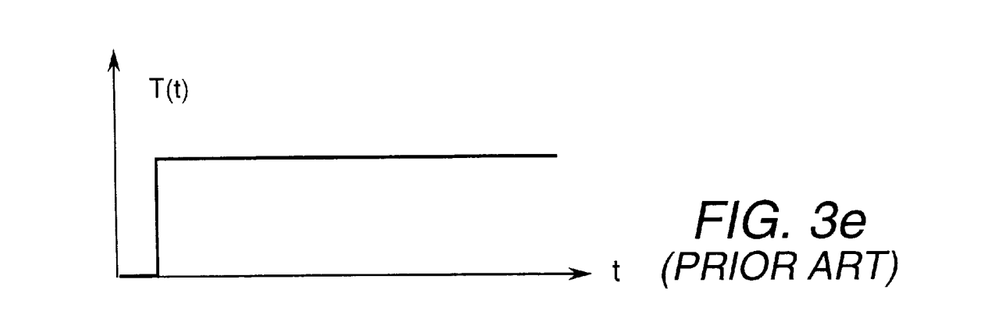
Figure 3F:
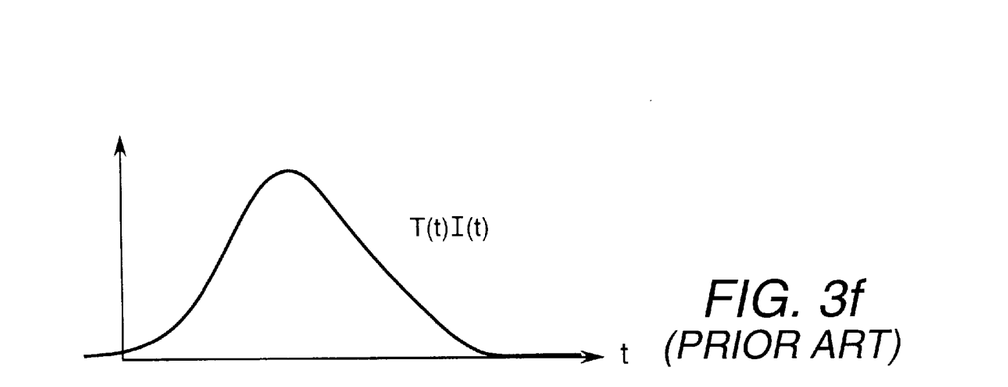

FIGS. 3a–3f illustrate examples of the effects on the pulse shape of systematic timing errors. In FIGS. 3a–3c, the laser pulse 11 has drifted to an earlier point in time with respect to the opening of the pulse slicer, resulting in a pulse having low energy, as shown in FIG. 3c. In FIGS. 3d–3f, the laser pulse 11 has drifted to a later point in time with respect to the opening of the pulse slicer, with the result that the pulse slicer opens before the laser pulse arrives and is therefore ineffective at sharpening the leading edge of the laser pulse, as shown in FIG. 3f. Since both the pulse energy and the shape of the leading edge of the pulse can significantly affect the mechanical stress generated in the part, the drifting in time of the laser pulse can significantly degrade the laser shock peening process.

Figure 4:
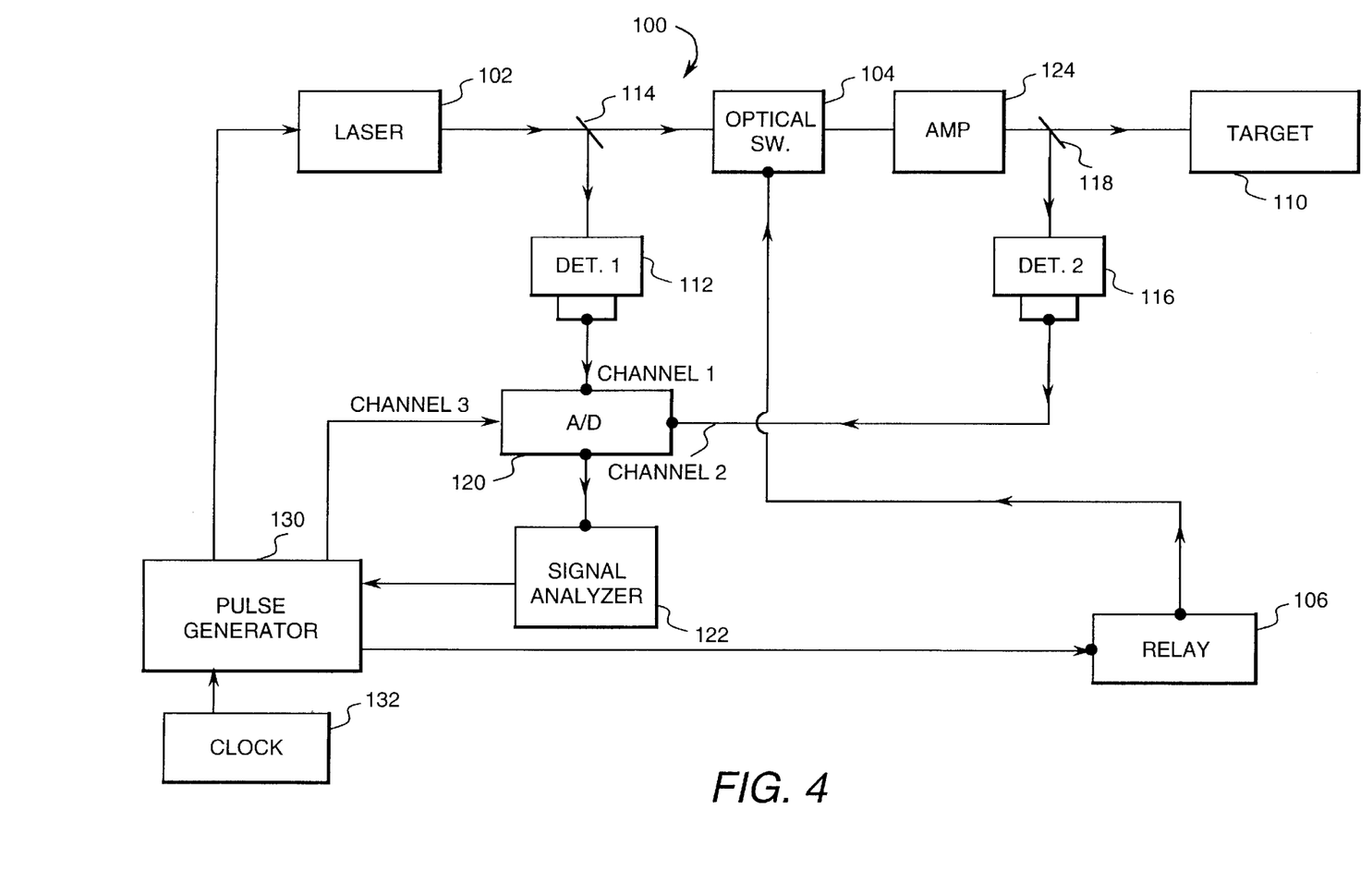
FIG. 4 is a diagram of a pulse shaping apparatus according to an exemplary embodiment of the invention.

FIG. 4 illustrates an apparatus for shaping a laser pulse according to an exemplary embodiment of the invention. The apparatus 100 includes a laser 102, which typically comprises a Nd:glass rod pumped by xenon or krypton flashlamps, a Q-switch such as a Pockels cell, and a laser cavity defined by a first nearly 100% reflective mirror and a second mirror of 70–80% reflectivity, for example. Typically the laser 102 operates at a wavelength of 1.054 microns and produces pulses having a full width half maximum (FWHM) pulse width, before slicing, of about 30 nanoseconds. The laser pulses are incident on an optical switch 104, e.g., an electro optical pulse slicer, which typically comprises a Pockels cell and a polarizer. The optical switch 104 opens and closes to allow or disallow pulses to propagate to the target 110. The apparatus also includes an optical amplifier 124 which increases the energy of the laser pulse before it is incident on the laser shock peening target 110.

The timing of the laser pulses and of the opening of the optical switch 104 is controlled by a pulse generator 130, such as a Stanford Research Instruments model DG-535 pulse generator. The pulse generator 130 controls the laser 102 by actuating a high voltage relay, such as that made by Inrad, Inc., powered by a high voltage power supply, which opens and closes the Q-switch in the laser oscillator. The pulse generator 130 controls the optical switch 104 also by controlling a high voltage relay powered by a high voltage power supply which opens and closes the optical switch 104. The pulse generator 130 may include its own internal clock, or may receive a clock signal from an external clock 132, as shown in FIG. 4, such as a clock in a power supply driver.

The pulses produced by the laser 102 are monitored by two optical detectors, according to an exemplary embodiment of the invention. A first optical detector 112 monitors the laser pulse by detecting a portion of the pulse energy diverted by a first leakage monitor 114 prior to incidence on the optical switch 104. A second optical detector 116 monitors the sliced optical pulse after it has passed through the optical switch 104 by detecting a portion of the pulse energy diverted by a second leakage monitor 118. According to one embodiment, the first and second leakage monitors 114, 118 comprise optical windows which have an anti-reflection coating on both surfaces, and which divert a small amount, e.g. <1%, typically about ¼%, of the pulse energy to the respective optical detectors 112, 116. Alternately, the first and second leakage monitors may comprise highly reflective turning mirrors, wherein energy transmitted through the mirrors is monitored by the optical detectors 112, 116, and the reflected energy is incident on the target 110. The optical detectors 112, 116 preferably have an electrical response sufficiently fast to accurately measure the temporal characteristics of the optical laser pulses. According to one example, the rise time of the optical detectors 112, 116 is preferably less than 1 nanosecond. The first and second optical detectors may comprise model number ET2000 photodiodes made by Electro Optics, Inc., for example. The optical detectors 112, 116 output respective voltage signals representative of the detected optical signals to first and second input channels of a digitizer 120, e.g. a Tektronix model TDS640 or TDS684B oscilloscope, which digitizes the signals. The digitizer 120 typically includes a third channel which receives a trigger signal from the pulse generator 130.

The digitized signals are then transmitted via a data bus to a signal analyzer 122, e.g. a personal computer, where they are analyzed for their timing information. Based on the received digitized signals, the signal analyzer 122 is programmed to determine an appropriate time delay for the optical switch 104 to cause the optical switch 104 to open at a suitable time with respect to the pulse, according to exemplary embodiments of the invention.

A method according to an exemplary embodiment of the invention will now be described. Initially, the apparatus 100 is calibrated to establish a common absolute time scale for the data acquired by the digitizer 120. Calibration can be accomplished by generating a pulse with the laser 102 while maintaining the optical switch 104 in an open state to allow the pulse to propagate through the optical switch 104 substantially unaltered. The signals which are received by the first and second optical detectors 112, 116 and digitized by the digitizer 120 will be substantially identical except for the "calibration delay" measured between the two signals. The calibration delay represents, for example, delays arising from different optical path lengths and cable lengths of the two acquisition channels into the digitizer 120, as well as delays inherent in the electronic components, e.g. the optical detectors, of the apparatus 100. Calibration may be achieved by storing the calibration delay in the signal analyzer 122 and compensating the appropriate signal in subsequent measurements, e.g., by adding the calibration delay to the earlier of the two signals.

After the apparatus has been calibrated, the exemplary method comprises the step of selecting an initial fixed delay D1 for the laser pulse and an initial variable delay D2 for the opening of the optical switch 104. The delays D1 and D2 may be selected by an operator, for example, through an input device, e.g. a keyboard, of the signal analyzer 122, which instructs the pulse generator 130 accordingly. The delays D1 and D2 are typically initially set such that the optical switch 104 opens at a point in time which produces a pulse having a relatively high energy and a sharp leading edge. For example, the delays D1 and D2 may be set such that the optical switch 104 opens after 10% of the pulse energy is incident on the optical switch 10, or after the power of the pulse has reached a predetermined value. The fixed delay D1 and the variable delay D2 are shown schematically in the pulse generator 130 in FIG. 5.

The next step in the method comprises detecting a laser pulse generated by the laser 102 with the optical detectors 112, 116. The optical detectors 112, 116 are used to monitor the laser pulses to enable the signal analyzer 122 to determine a first reference time point T1 on the pulse and a second reference time point T2 at the opening of the optical switch with respect to some fixed event such as a timing pulse from the clock 132. The first optical detector 112 detects an optical signal used to determine the first reference time point T1 with respect to the pulse, while the second optical detector detects an optical signal used to determine the second reference time point T2 with respect to the opening of the optical switch 104. The detectors 112, 116 convert the optical signals into respective voltage signals which are transmitted to the first and second channels of the digitizer 120. The digitizer 120 digitizes the signals and transmits them to the signal analyzer 122.

The signal analyzer 122 then calculates the first reference time point T1 on the pulse and the second reference time point T2 at the opening of the optical switch 104. The first reference time point Ti is typically defined by either an amplitude or an area of the digitized pulse. For example, the first reference time point T1 may represent the time at which the digitized signal first reaches a certain amplitude. Alternately, the first reference time point T1 may represent the time at which the cumulative energy of the pulse reaches a certain value. The first reference time point T1 typically represents the time at which the optical switch 104 should open to produce the desired pulse shape.

The second reference time point T2 is typically defined by the midpoint of the leading edge of the opening of the optical switch 104. For example, the second reference time point T2 may comprise the point in time at which the amplitude of the leading edge is at half of its peak value. The amplifier 124 shown in FIG. 4, in addition to increasing the energy of the pulse, also sharpens the leading edge at the opening of the optical switch 104, which facilitates identification of the leading edge, especially if the optical switch 104 opens early in the pulse when the amplitude of the pulse is small. The amplifier 124 may comprise, for example, an Nd:glass rod pumped with flashlamps.

The first and second optical detectors 112, 116 enable active control over the characteristics of the laser pulse by providing signals which represent the time of the pulse and the time at which the optical switch 104 opens. This acquired data is then used by the signal analyzer 122 to determine if the laser pulse is running late or early with respect to the opening of the optical switch 104.

According to the next step in the exemplary method, the signal analyzer 122, after calculating the reference time points T1 and T2, adjusts the variable delay D2 for the optical switch 104 produced in the pulse generator 130 to cause the optical switch 104 to open at a time with respect to the pulse which produces a suitable pulse shape. For example, if the first reference time point T1 of the pulse corresponds to the desired slice time, the variable delay D2 is adjusted by the difference between the measured T1 and T2 values so that T1 is equal to T2 for a subsequent pulse. As shown in FIG. 4, the signal analyzer 122 sends a control command containing the new value of D2 to the pulse generator 130 to compensate for the drift determined from the measured laser pulse. The updated value of D2 is then used by the pulse generator 130 in initiating the next opening of the optical switch 104. Therefore, the optical switch 104 opens at the desired time relative to the pulse, even though the pulse may drift in time.

The value of D2 determined by the signal analyzer 122 can be chosen to maintain a fixed transmitted power at onset with respect to the laser's peak power or a fixed transmitted energy with respect to the laser pulse's total energy, for example. These two methods of operation may be referred to as "slicing by height" and "slicing by area", respectively.

To prevent the value of D2 from fluctuating significantly due to a noisy signal, the change in the value of D2 determined by the signal analyzer 122 can be limited by the signal analyzer for any one pulse, according to another aspect of the invention. In a noisy environment, the timing of the pulse may fluctuate significantly from pulse to pulse. However because it is not generally feasible to predict the time fluctuation from pulse to pulse caused by noise, the change in D2 is preferably limited to the rate of temporal drifting which may occur over many pulses. Thus, the signal analyzer 122 is programmed to limit the change in D2 from pulse to pulse to be no more than the value of the long term drift over one pulse, e.g. 1 nanosecond per pulse. This limitation prevents the value of D2 from fluctuating significantly due to noise.

In addition to the pulse to pulse limitation, the signal analyzer 122 can be programmed to limit the cumulative change in D2, with respect to its original value, to a maximum value. When the value of D2 changes beyond the maximum cumulative value, e.g. beyond 50 nanoseconds, the signal analyzer 122 can interrupt operations and alert the operator, for example. The maximum cumulative value thus prevents the system from operating or alerts the operator if the value of D2 changes by a large amount, which may indicate a problem with the apparatus.

Figure 5:
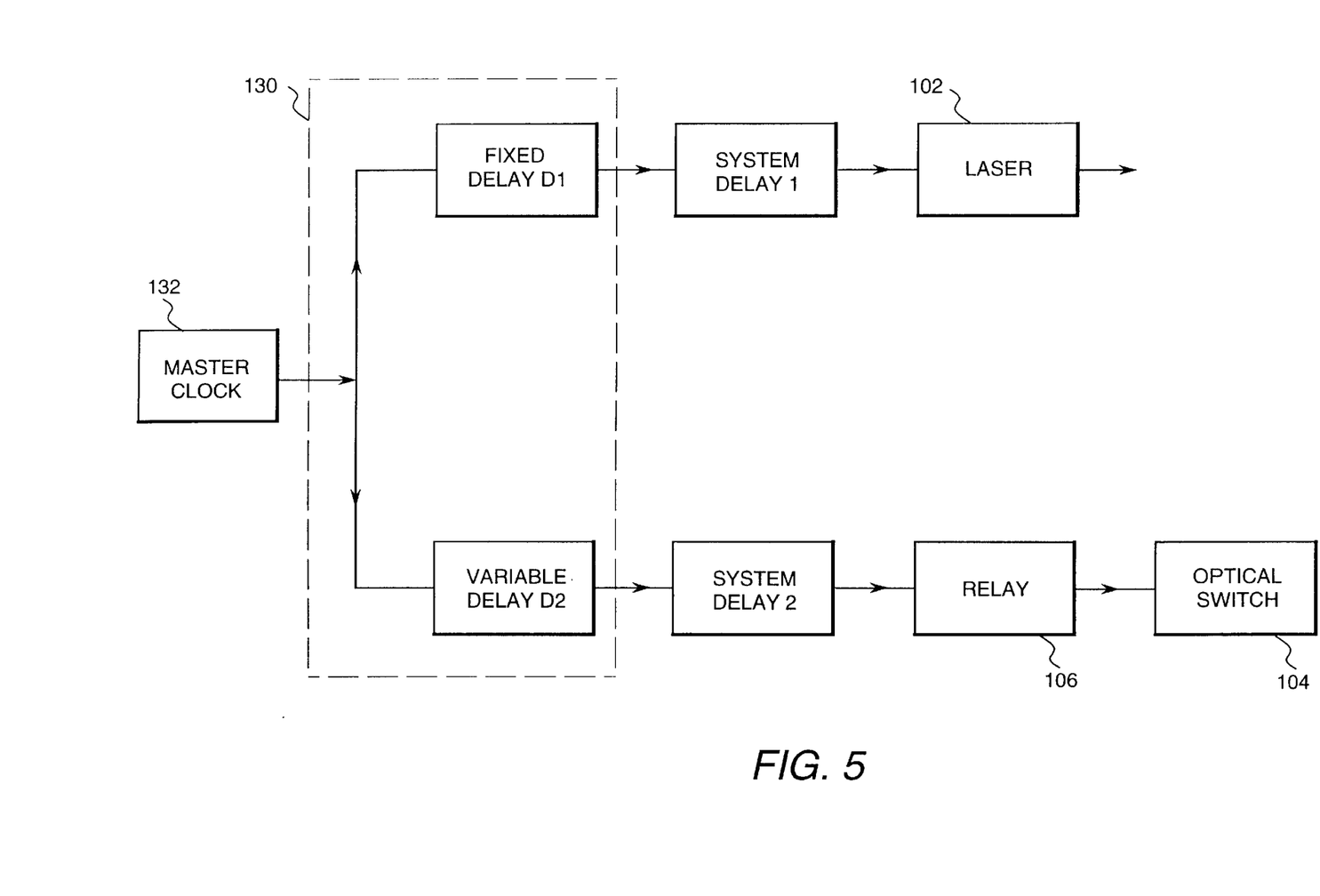
FIG. 5 is a diagram illustrating the delays in the apparatus of FIG. 4.

FIG. 5 is a block diagram illustrating drift correction according to an exemplary embodiment of the invention. In FIG. 5, the fixed delay D1 and the variable delay D2 are produced by the pulse generator 130 on different channels. The boxes labeled "system delay 1" and "system delay 2" represent temporal drifts in the system which alter the relative timing of the pulse and the optical switch 104. The fixed delay D1 is used to delay the start of the laser pulse by some fixed amount and is provided to allow the drift correction of the optical switch 104 to move to earlier times with respect to the laser pulse. The variable delay D2 allows the timing of the opening of the optical switch 104 to follow a drift in the timing of the pulse. Normally, D2 is nearly equal to D1.

According to another aspect of the invention, the leakage beams are focused to reduce the sensitivity of the apparatus to spatial variations of the leakage beams with respect to the detector, which cause temporal errors. In a typical pulse, the time history of the amplitude is different at different points in the cross section of the beam. Thus, spatial variations of the beam on the detector produce temporal variations in the data. This source of error can be significantly reduced by spatially integrating the beam, e.g. focusing the beam with a lens.

Figure 6:
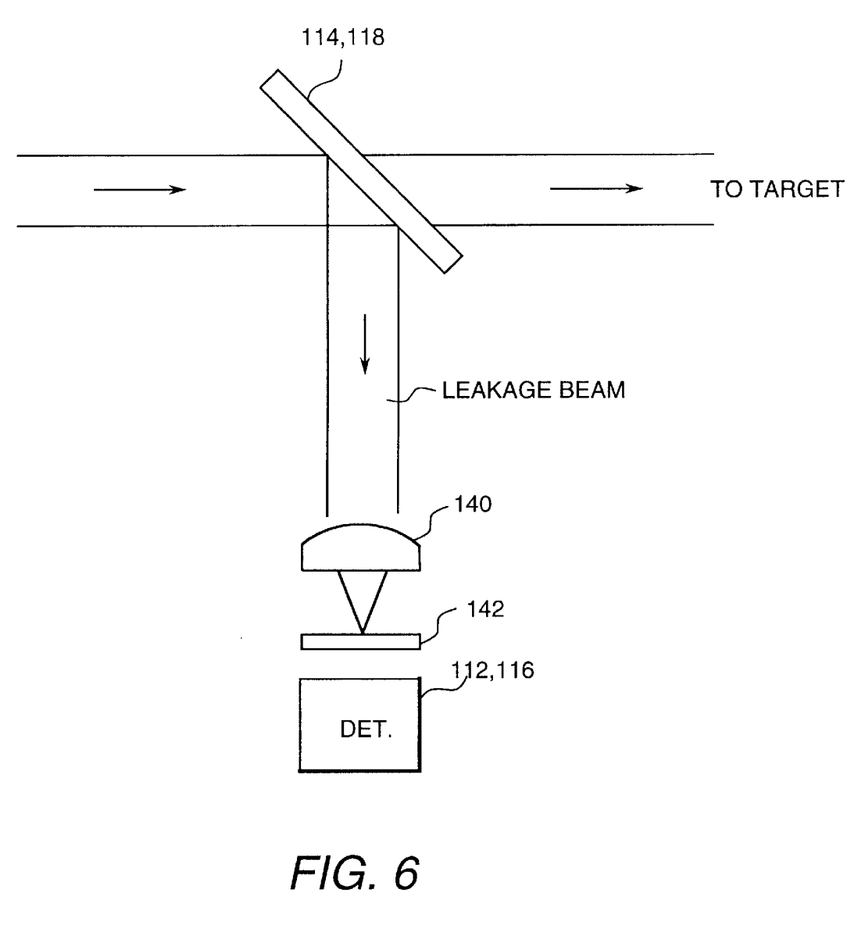
FIG. 6 is a drawing of a device for focusing a leakage beam to spatially integrate the leakage beam.

As shown in FIG. 6, a lens 140 can be provided which focuses the leakage beam, thereby spatially integrating the leakage beam. A ground glass screen 142 can also be provided, having a relatively rough surface, to further spatially integrate the optical signal before it is incident on the optical detector. The lens 140 and the glass screen 142 spatially integrate the optical signal which reduces errors caused by the detector receiving signals from different points in the cross section of the beam which have different temporal characteristics. A lens 140 and glass screen 142 can be provided for each of the optical detectors 112, 116.

According to another embodiment of the invention, the second optical detector 116 is used to measure both the time of the opening of the optical switch 104 and the time of the pulse, thus obviating the need for the first optical detector 112. If the first reference time point T1 of the pulse has been sliced off by the optical switch 104, the first reference time point T1 can be determined analytically. For example, during calibration, the trace of the calibration pulse can be stored, as well as the times at which the trace is at 50% of its peak value. From this information, and a measurement of the time at which the pulse of interest falls to 50% of its peak value, the first reference time point can be determined.

Although the invention has been described with respect to exemplary embodiments, those skilled in the art will recognize that various modification may be made without departing from the scope and spirit of the invention as defined in the following claims.

What is claimed is:

1. A method of shaping a laser pulse comprising the steps of:

generating the laser pulse with a laser;

opening an optical switch to allow the laser pulse to pass through the optical switch;

determining a first reference time point with respect to the laser pulse;

determining a second reference time point after the laser pulse passes through said optical switch opening; and adjusting an opening time of the optical switch based on the first and second reference time points to shape the laser pulse.

2. The method of claim 1, wherein the first reference time point is determined based on a preselected power of the laser pulse.

3. The method of claim 1, wherein the first reference time point is determined based on a preselected fraction of energy of the laser pulse.

4. The method of claim 1, wherein the first reference time point is determined with a first optical detector which samples the laser pulse before the laser pulse reaches the optical switch.

5. The method of claim 1, further comprising the step of:

generating a calibration pulse with the laser while the optical switch is open;

detecting the calibration pulse with first and second optical detectors, which detectors are at different points on the optical path of the laser pulse;

calculating a calibration delay which corrects for a relative time delay between the detection of the calibration pulse by the first optical detector and the detection of the calibration pulse by the second optical detector.

6. The method of claim 5, wherein the calibration delay also corrects for a difference in propagation times of first and second signals output by the first and second optical detectors to a digitizer.

7. The method of claim 1, further comprising the step of delaying a start of the laser pulse by a predetermined time period after a clock pulse to allow adjustment of the opening time of the optical switch to an earlier time.

8. An apparatus for shaping a laser pulse comprising:

a laser which generates the laser pulse;

a first optical detector which detects the laser pulse and generates a first signal representing the laser pulse;

an optical switch through which the laser pulse passes;

a second optical detector which detects the laser pulse after the laser pulse has passed through the optical switch, and which generates a second signal representing the laser pulse;

a computer which receives the first and second signals and which calculates a delay period based on the first and second signals; and a pulse generator which receives the delay period from the computer and which generates a pulse delayed by the delay period to open the optical switch.

9. The apparatus of claim 8, wherein the laser comprises a Nd:glass rod, a flashlamp, and a Q-switch.

10. The apparatus of claim 8, wherein the optical switch comprises a Pockels cell and a polarizer.

11. The apparatus of claim 8, wherein the first and second optical detectors comprise photodiodes.

* * * * *